US012790179B2

(12) United States Patent
Burri et al.

(10) Patent No.: US 12,790,179 B2
(45) Date of Patent: Nov. 10, 2026

(54) METHOD AND DEVICE FOR AUTOMATED MONITORING OF THE DRIVING OPERATION OF A PASSENGER TRANSPORT SYSTEM

(71) Applicant: INVENTIO AG, Hergiswil (CH)

(72) Inventors: Jürg Burri, Hirschthal (CH); Gerhard Kleewein, Pressbaum (AT); Georg Wagenleitner, Roßleithen (AT)

(73) Assignee: Inventio AG, Hergiswil (CH)

( * ) Notice: Subject to any disclaimer, the term of this patent is extended or adjusted under 35 U.S.C. 154(b) by 32 days.

(21) Appl. No.: 18/840,861

(22) PCT Filed: Mar. 27, 2023

(86) PCT No.: PCT/EP2023/057773
§ 371 (c)(1),
(2) Date: Aug. 22, 2024

(87) PCT Pub. No.: WO2023/194135
PCT Pub. Date: Oct. 12, 2023

(65) Prior Publication Data

US 2025/0171275 A1 May 29, 2025

(30) Foreign Application Priority Data

Apr. 7, 2022 (EP) .................................... 22167054

(51) Int. Cl.
*B66B 27/00* (2006.01)
*B66B 25/00* (2006.01)
*B66B 29/00* (2006.01)

(52) U.S. Cl.
CPC ............ *B66B 27/00* (2013.01); *B66B 29/005* (2013.01); *B66B 25/006* (2013.01)

(58) Field of Classification Search
CPC ...... B66B 27/00; B66B 25/006; B66B 29/005
See application file for complete search history.

(56) References Cited

U.S. PATENT DOCUMENTS 10,059,569 B2 * 8/2018 Fang ....................... B66B 29/08
10,427,915 B2 * 10/2019 González ................ B66B 29/08
(Continued)

FOREIGN PATENT DOCUMENTS

CN 107665326 A 2/2018
CN 111115394 A 5/2020
(Continued)

OTHER PUBLICATIONS

International Search Report received in International Application No. PCT/EP2023/057773, mailed Jun. 6, 2023.
(Continued)

*Primary Examiner* — Mark A Deuble
(74) *Attorney, Agent, or Firm* — Knobbe Martens Olson & Bear LLP

(57) ABSTRACT

A method for automated monitoring of a passenger transport system with a monitoring system. The monitoring system has a hazard analysis module and a motion-sensing module. The motion-sensing module is configured to capture real motion sequence recordings. The method comprises: receiving real motion sequence recordings and data of a digital double of the passenger transport system in the hazard analysis module, wherein the data comprise information relating to physical properties of the passenger transport system, which allow determination of a visual appearance of the passenger transport system; determining dynamic objects information on the passenger transport system with the hazard analysis module based on the received recordings and data; determining a current hazardous situation on the passenger transport system with the hazard analysis module based on an analysis of the determined dynamic objects; and outputting a warning with the hazard analysis module based on the current hazardous situation.

19 Claims, 1 Drawing Sheet

(56) References Cited

U.S. PATENT DOCUMENTS

| | | | | |
|---|---|---|---|---|
| 11,339,030 | B2 * | 5/2022 | Álvarez | G01C 5/00 |
| 11,577,937 | B2 * | 2/2023 | Novacek | B66B 5/0025 |
| 11,912,532 | B2 * | 2/2024 | Yuksel | B66B 25/00 |
| 12,162,726 | B2 * | 12/2024 | Brestensky | B66B 25/006 |
| 12,221,321 | B2 * | 2/2025 | Novacek | B66B 25/006 |
| 2005/0088520 | A1 * | 4/2005 | Wiesinger | B66B 29/005 348/42 |
| 2021/0276832 | A1 | 9/2021 | Brestensky et al. | |
| 2025/0118076 | A1 * | 4/2025 | Burri | G06V 20/44 |

FOREIGN PATENT DOCUMENTS

| | | | | |
|---|---|---|---|---|
| CN | 113071963 | A | 7/2021 | |
| CN | 113487095 | A | 10/2021 | |
| EP | 1013599 | A1 | 6/2000 | |
| EP | 1419988 | A1 | 5/2004 | |
| EP | 3276535 | A1 * | 1/2018 | B66B 29/005 |
| JP | 2010070299 | A | 4/2010 | |
| JP | 4595010 | B2 | 12/2010 | |
| JP | 5917327 | B2 | 5/2016 | |
| JP | 2020097457 | A | 6/2020 | |
| KR | 20110105566 | A | 9/2011 | |
| KR | 101219407 | B1 | 1/2013 | |
| WO | WO 2009152766 | A1 | 12/2009 | |
| WO | WO 2021074220 | A1 | 4/2021 | |
| WO | WO 2021144157 | A1 | 7/2021 | |

OTHER PUBLICATIONS

Zhang Kunshi, Qianting Guangdian Zhuangbei Jishu, Submarine optoelectronic equipment technology,Sep. 1, 2021, Hrbeupress.

* cited by examiner

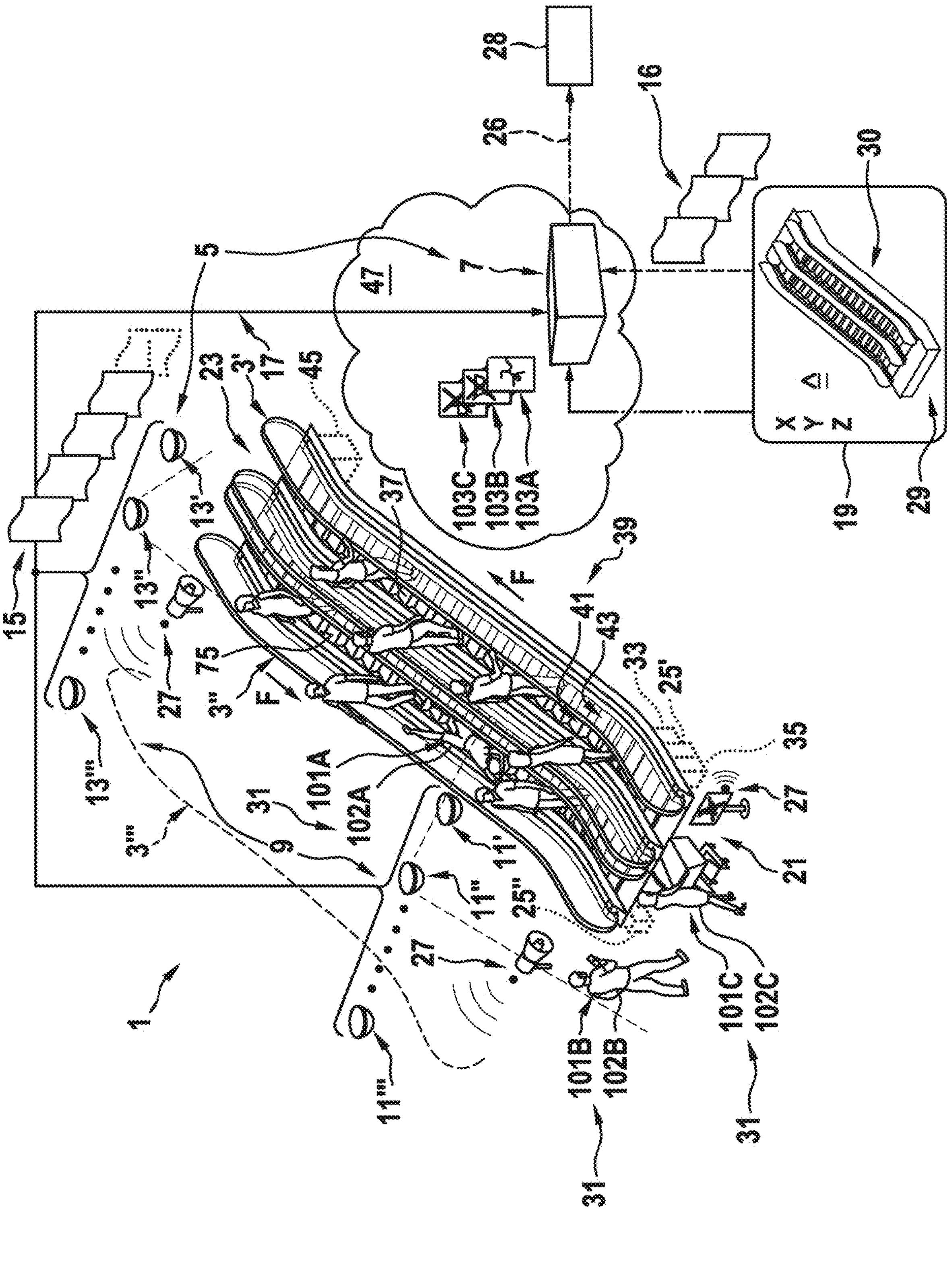
1
3'
3"
3'''
5
7
9
11'
11"
11'''
13'
13"
13'''
15
16
17
19
21
23
25'
25"
26
27
28
29
30
31
33
35
37
39
41
43
45
47
75
101A
102A
101B
102B
101C
102C
103A
103B
103C
F
X
Y
Z

METHOD AND DEVICE FOR AUTOMATED MONITORING OF THE DRIVING OPERATION OF A PASSENGER TRANSPORT SYSTEM

TECHNICAL FIELD

The disclosure relates to a method for monitoring the travel operation of one or more passenger transport systems. The disclosure further relates to a device for carrying out this method, a correspondingly equipped passenger transport system, and a computer program product and a computer-readable medium.

SUMMARY

Passenger transport systems such as escalators and moving walkways are used, for example in structures such as department stores and large shopping centers, but also in train stations, subway stations, and airports to transport passengers. In particular in the three last-mentioned settings, there can be an increased risk of accidents, for example, if time-pressed users jostle other users on the passenger transport systems. This means that persons can fall on the escalator transport belt or step belt or on the moving walkway plate belt and sustain serious injuries if the step belt or plate belt is not stopped, for example, by means of an emergency stop. Others recklessly misuse passenger transport systems as sports and play equipment, putting themselves and other users in danger.

For monitoring passenger transport systems, video cameras are conventionally used, the video sequences from which are transmitted in real time to a monitoring room and are displayed there on screens. A plurality of passenger transport systems are usually monitored by monitoring personnel from the monitoring room. However, inattentiveness or fatigue on the part of the monitoring personnel can lead to critical situations that occur on the passenger transport system not being perceived or not perceived in time, and accordingly to countermeasures or assistance not being initiated or being initiated too late.

In order to solve the above problem, monitoring systems are set up in such a way that critical situations for users on the passenger transport system can be automatically recognized by processing motion sequence recordings with image recognition. As soon as a critical situation is recognized, the corresponding motion sequence recording is displayed, for example, on the screen in the monitoring room so that monitoring personnel are alerted and can accordingly initiate countermeasures or assistance in a timely manner.

EP 3 276 535 A1 describes such a monitoring system for a passenger transport system.

In an analysis of motion sequence recordings, such as are supplied by cameras used for monitoring the passenger transport system, differential images are often worked with as part of image recognition. A reference image is typically subtracted from one or more currently recorded images of a motion sequence recording. The images currently recorded represent a recreation of the real passenger transport system including the passengers and/or objects located thereon. The reference image, on the other hand, represents the passenger transport system without passengers and/or objects and was recorded, for example, before the system was put into operation. Only the passengers and/or objects are represented in the differential images formed thereby. Such differential images can be evaluated in an automated manner much more easily than the original motion sequence recordings, since very many details of the passenger transport system are reproduced in the original motion sequence recordings, which details make image analysis more difficult without making a contribution to the recognition of critical situations on the passenger transport system.

However, a specific implementation of the generation of differential images can be complex. In particular, the fact that parts of the passenger transport system, for example, its transport belt, move relative to other parts during operation can make generating differential images more difficult. For example, easily evaluable differential images can generally only be generated if a current operating state of the passenger transport system, e.g., for example, a current positioning of the transport belt thereof, corresponds as precisely as possible to that operating state in which the passenger transport system was when the reference image was recorded. For example, step edges of a monitored escalator in the currently recorded image of a motion sequence recording should correspond precisely to the position of step edges in a reference image.

In an alternative approach for the automated monitoring of passenger transport systems, special cameras can be used which are able to supply three-dimensional recordings of a monitored region. For example, TOF (time of flight) cameras can be used in which, in addition to a lateral image resolution, information about a distance of objects observed in the monitored region or captured image points is also determined relative to the camera. A monitored distance range can thereby be selected such that moving components of the passenger transport system, such as its steps or plates, are no longer captured. If necessary, the lateral detection range of the TOF camera can also be limited in such a way that balustrades arranged laterally of the transport belt are no longer visible. In this case, a generation of differential images can be dispensed with. However, important regions of the passenger transport system, such as the foot spaces on footplates of the steps, are not represented in the motion sequence recordings of TOF cameras set in this way, so that they cannot be taken into account when assessing critical situations.

In order to solve the problems described above, there is a need to provide a monitoring method and a monitoring system which allow reliable and/or relatively easily implemented automated monitoring of the travel operation of a passenger transport system. There is also a need for a correspondingly equipped passenger transport system and a computer program product for implementing the monitoring method and a computer-readable medium storing the computer program product.

Such a need can be met by the subject matter of the present disclosure. Advantageous embodiments are specified in the description herein and are depicted in the figure.

According to the disclosure, a method for automated monitoring of the travel operation of a passenger transport system with a monitoring system is described herein. The monitoring system can have a hazard analysis module and at least one motion-sensing module. The motion-sensing module can be directed toward the passenger transport system and can be configured to capture electronically processable motion sequence recordings of situations that occur on the associated passenger transport system. The method can comprise at least the following steps, possibly, but not necessarily, in the order provided; receiving real motion sequence recordings in the hazard analysis module, wherein the real motion sequence recordings have been captured by the at least one motion-sensing module; receiving data of a digital double of the passenger transport system in the hazard analysis module, wherein the data comprise at least information relating to physical properties of the passenger transport system which allow a conclusion to be drawn about a visual appearance of the passenger transport system in a predetermined motion state; determining information relating to dynamic objects on the passenger transport system by the hazard analysis module, wherein the information is determined based on the received data of the digital double and the real motion sequence recordings; determining information relating to a current hazardous situation on the passenger transport system by the hazard analysis module based on an analysis of motions of the determined dynamic objects; and outputting a warning by the hazard analysis module based on the determined information relating to the current hazardous situation.

According to the disclosure, a device in the form of a monitoring system for monitoring travel operation of a passenger transport system is described herein. In this case, the monitoring system can have a hazard analysis module which is configured to receive data from a motion-sensing module and from a database module. The motion-sensing module can be directed toward the passenger transport system and can be configured to capture electronically processable motion sequence recordings of situations that occur on the associated passenger transport system. Data of a digital double of the passenger transport system can be stored in the database module, wherein the data can comprise at least information relating to physical properties of the passenger transport system which can allow a conclusion to be drawn about a visual appearance of the passenger transport system in a predetermined motion state. The hazard analysis module can be configured to carry out or control a method according to an embodiment of the disclosure.

According to the disclosure, a passenger transport system is described herein which can have a transport belt, a drive for driving the transport belt, a controller for controlling the drive, and a monitoring system according to an embodiment of the disclosure, wherein the motion-sensing module of the monitoring system can be directed at least toward partial regions of the transport belt.

According to the disclosure, a computer program product is described herein which can comprise machine-readable program instructions which, when executed on a programmable device, can cause the device to carry out or control a method according to an embodiment of the disclosure.

According to the disclosure, a computer-readable medium having a computer program product can be stored thereon according to an embodiment of the disclosure is described herein.

In brief, and without restricting the scope of the disclosure, an idea on which the disclosure is based can be seen in monitoring the travel operation of a passenger transport system, not, as conventionally, by comparing motion sequence recordings that are supplied by a motion-sensing module with, for example, a camera with images that serve as reference images and which were also recorded with a camera in order to ultimately create differential images from which information about a current hazardous situation can then be derived. Instead of such reference images, data of a digital double of the passenger transport system can be used instead in order to determine information about dynamic objects, such as moving passengers, their baggage and carried objects, animals and the like on the passenger transport system, in order to be able to deduce current hazardous situations by analyzing motions of these dynamic objects. In this case, the data of the digital double can represent physical properties of the passenger transport system such as spatial dimensions of components and their dynamic motions which allow a conclusion to be drawn about an appearance of the same. Accordingly, these data can be used to generate, for example, virtual motion sequence recordings which can represent the region of the passenger transport system monitored by the motion-sensing module. These virtual motion sequence recordings can then be used to derive information about the dynamic objects moving on the passenger transport system. If necessary, the virtual motion sequence recordings can be used similarly to conventional reference images to generate differential images with subtraction from the real motion sequence recordings. In comparison to using conventional reference images, however, the virtual motion sequence recordings can be determined from the data of the digital double with higher precision, fewer image artifacts and/or lower computing power. In addition, the virtual motion sequence recordings can be synchronized in a relatively simple manner with the currently recorded real motion sequence recordings, whereby generating differential images can be considerably simplified.

Possible embodiments and advantages of embodiments are described in more detail herein.

A passenger transport system can be set up to transport passengers and/or objects within a structure. The passenger transport system can be designed, for example, as an escalator or as a moving walkway. The passenger transport system described herein can have stationary components which are permanently connected to the structure, such as a carrying frame, a drive, balustrades, etc. Furthermore, the passenger transport system can have movable components which can be displaced relative to the stationary components. In escalators, for example, a plurality of steps which are coupled one behind the other in a direction of motion can form a step belt which can be displaced relative to the stationary components in a circulating manner by a drive. In moving walkways, a plurality of plates can be coupled one behind the other to form a plate belt that can be displaced in a circulating manner. Passengers can use the circulating step belt or plate belt in order to be transported along a travel path.

In order to be able to monitor the travel operation of the passenger transport system, it can have a monitoring system in which data which are determined by a motion-sensing module are evaluated by a hazard analysis module in order to be able to derive information about current hazardous situations and then to be able to output warnings if necessary.

The motion-sensing module can be in this case a device which is configured to capture motion sequence recordings of situations that occur on the passenger transport system. In particular, the motion-sensing module can be configured to optically or visually monitor situations on the passenger transport system and accordingly to output them as image data representing the motion sequence recordings. The motion sequence recordings can be a plurality of successive image recordings, which, for example, represent a region of the passenger transport system two-dimensionally or three-dimensionally. For this purpose, the motion-sensing module can, for example, use one or more image capturing devices such as, for example, photo cameras, video cameras, thermal imaging cameras, laser scanners, TOF cameras, a set of a plurality of sensors and/or the like, the motion sequence recordings of which are accordingly captured as an image sequence, video film sequence, thermal image sequence, etc. in an electronically processable form. When a plurality of motion-sensing modules per passenger transport system are used, each motion-sensing module can preferably be associated with a specific section or region, so that the entire escalator or the entire moving walkway is not visible in any of the motion sequence recordings.

The real motion sequence recordings currently captured by the motion-sensing module can be transmitted to and received by the hazard analysis module as a data stream. In order to be able to process these data, the hazard analysis module can be designed as a data processing system and can have, among other things, a processor, with which the data are processed in a predefined manner. The processor can preferably be programmable with a computer program product. In addition, the hazard analysis module can generally have a data memory and data interfaces in order to be able to exchange data with external devices and/or databases.

The hazard analysis module described herein can be in particular configured to receive and process data of a digital double of the passenger transport system in addition to the real motion sequence recordings.

The digital double can sometimes also be referred to as digital twin. A digital double can be generally understood to mean a virtual representation of an actually existing object, as can be in the present case of the passenger transport system, which can represent the physical properties of the object as realistically as possible. The digital double can usually be stored in a database as a data set (sometimes also referred to as a digital double data set). A wide variety of parameters or properties of the real object can be stored in this data set depending on the use case and purpose. For example, the data set can comprise information relating to mechanical properties, geometric properties, optical properties, electrical properties, magnetic properties, material properties, etc. of the real object. In this case, the data contained in the digital double can represent the real properties of the object as precisely as possible in such a way that properties of the real object can be reproduced very close to reality, for example at a later point in time, without actually having to have access to the real object. In addition, the data contained in the digital double can also allow behavior of the real object to be reproduced or even predicted under certain conditions and/or certain influences. For this purpose, the data of the digital double can be used, for example, for physical calculations, modeling, and/or simulations.

For use in the monitoring method presented herein, the data of the digital double can allow a conclusion to be drawn about a visual appearance of the passenger transport system. In particular, such a conclusion can be possible for a predetermined motion state of the passenger transport system. In this case, the visual appearance can represent an external appearance of the passenger transport system that can be recognized from the outside, similarly to a plan view of the passenger transport system, for example, with a camera-based motion-sensing module whose field of view is directed toward the passenger transport system. In particular, the external appearance of the step belt or plate belt, an entry region and/or exit region, a handrail on a balustrade, etc., of the passenger transport system can be able to be represented on the basis of the digital double.

The digital double can thereby represent the appearance of the passenger transport system in at least one predetermined motion state. A motion state can be understood here to mean a stationary or dynamic state of the passenger transport system. The motion state can generally at least indicate at which positions moving components of the passenger transport system are located relative to its stationary components and/or to other moving components. In particular, the motion state can indicate where steps or plates of the step belt or plate belt are currently located. Furthermore, the motion state can indicate at which speeds the moving components move relative to one another and/or relative to the stationary components.

The data in the digital double can allow the visual appearance of the passenger transport system to be represented as precisely as possible in at least one predetermined motion state. For this purpose, design data (e.g., CAD data), material data, processing data, assembly data, maintenance data, etc. can be stored in the digital double, wherein these data represent information about physical parameters which have an influence on the appearance (shell) of the passenger transport system. If necessary, data can be recorded in the digital double which can allow the visual appearance of the passenger transport system to be represented in a plurality of different motion states. In addition, statements about the visual appearance of the passenger transport system in other motion states can be calculated, simulated, modeled, extrapolated, or determined in another way on the basis of the data stored in the digital double.

The hazard analysis module can be configured to process the real motion sequence recordings received from the motion-sensing module as far as possible in real time with the aid of the data received from the digital double in order to be able to derive information about a possibly prevailing current hazardous situation on the passenger transport system therefrom. For this purpose, the hazard analysis module can determine information about dynamic objects on the passenger transport system. Such dynamic objects can be, for example, passengers, objects, animals, etc., which are transported by the passenger transport system and which thereby remain passive. However, dynamic objects can also be passengers or the like which move relative to the passenger transport system, for example when a passenger falls or when a passenger actively moves along the step belt or plate belt of the passenger transport system.

The hazard analysis module can then analyze motions of the determined dynamic objects in order to be able to derive information relating to a current hazardous situation on the basis thereof. For example, in the hazard analysis module, the motion sequence recordings can be examined for critical situations with analysis algorithms taking into account the data of the digital double. For this purpose, automated recognition processes or analysis methods known from the technical field of surveillance electronics, such as image analysis methods and corresponding algorithms, motion analysis methods and corresponding algorithms, statistical and heuristic evaluation methods and the like, can be used for recognizing motion sequences of users of the passenger transport system that deviate from usual motion sequences or are atypical motion sequences. Depending on the motion sequence of a deviating motion process, the hazard analysis module can assume a hazardous situation, e.g., for example, an accident situation in which there is an acute risk of a passenger being injured or getting injured, or a critical situation in which at least a significant risk of such injuries exists.

If a hazardous situation is recognized, a warning can be output. The warning can, for example, be transmitted to another device. For example, the warning can be transmitted to a remote monitoring center. The output of the warning can trigger reactions in a receiving device, which ultimately can effect measures with which the hazardous situation can be counteracted. For example, due to the warning, the operation of the passenger transport system can be stopped or slowed down. Alternatively or additionally, the warning can cause a warning signal to be output to users of the passenger transport system in order to warn them that the operating mode of the passenger transport system will be changed briefly, e.g., the passenger transport system will be, for example, braked. Such a warning signal can preferably be output visually, acoustically or in another manner in a direct vicinity of the passenger transport system.

According to one embodiment, virtual motion sequence recordings can be determined by the hazard analysis module based on the received data of the digital double. The information relating to dynamic objects on the passenger transport system can then be determined by the hazard analysis module by comparing the virtual motion sequence recordings with the real motion sequence recordings.

In other words, the data of the digital double can be used to create virtual motion sequence recordings which represent the appearance of the passenger transport system in a similar or identical manner as the real motion sequence recordings that are recorded by the motion-sensing module. By comparing these virtual motion sequence recordings with the current real motion sequence recordings, information about the dynamic objects on the passenger transport system can be determined and, from this, possible hazardous situations can be deduced.

According to a specific embodiment, the comparison of the real motion sequence recordings with the virtual motion sequence recordings can be carried out by forming the difference between the real motion sequence recordings and the virtual motion sequence recordings.

During such a difference forming process, a virtual motion sequence recording can be subtracted from an associated real motion sequence recording, or vice versa. Those image portions that are the same in both motion sequence recordings can thus no longer be represented in the obtained differential image. An evaluation of the motion sequence recordings can thereby be considerably simplified.

According to a further specific embodiment, the method can further comprise synchronizing the real motion sequence recordings with the virtual motion sequence recordings such that the passenger transport system is in an identical motion state in both motion sequence recordings.

Synchronizing the real with the virtual motion sequence recordings can, in particular, lead to moving components of the passenger transport system being located at the same positions and/or moving in the same way in both recording types. The synchronization can take place within predefined tolerances. The real motion sequence recordings can therefore be compared particularly well with the virtual motion sequence recordings after such a synchronization.

If the two mutually synchronized motion sequence recordings represent the passenger transport system in an identical motion state, the components of the passenger transport system can generally be no longer shown in a differential image. Passengers or objects which are currently located on the passenger transport system and thus are shown in the real motion sequence recording but not in the virtual motion sequence recording can thus be represented as dynamic objects in the differential image and can be analyzed very well in this image.

According to a further specific embodiment, the synchronization can take place taking into account data which are received from a controller of the passenger transport system and which contain information about an actual current motion state of the passenger transport system.

In other words, to synchronize the real with the virtual motion sequence recordings in the monitoring method presented herein, data which can be provided by a controller of the passenger transport system and provide information about the current motion state of the passenger transport system can be used. For example, the controller can provide precise information on the position at which the step belt or plate belt is currently located along the travel path, e.g., where the steps or plates are currently arranged. Information about a current motion, in particular a current speed and/or direction of motion, of the step belt or plate belt can also be present in the controller. If such information is retrieved or received by the hazard analysis module, it can be used to suitably prepare the received data of the digital double in order to synchronize the virtual appearance represented by it or the virtual motion sequence recordings of the passenger transport system that can be generated therefrom with the real motion sequence recordings.

According to a further specific embodiment, the synchronization can additionally or alternatively be carried out taking into account speed information of a frequency converter of the passenger transport system or a signal of a sensor, such as an encoder, arranged on the passenger transport system.

A frequency converter can be provided in the passenger transport system to control a drive of the step belt or plate belt by suitably adapting frequencies within a power supply in a desired manner. The speed information used or determined by the frequency converter can be retrieved or received by the hazard analysis module. This information can then be used to prepare the data of the digital double such that they represent the virtual appearance of the passenger transport system with components moving therein, in particular a moving step belt or plate belt, in such a way that their speed corresponds to the speed of the real components indicated by the frequency converter.

Similarly, an encoder can be provided in a passenger transport system to output signals that indicate a current speed of moving components of the passenger transport system. Such an encoder can, for example, have moving components which are moved by the moving components of the passenger transport system and whose motion can then be detected by suitable sensors in order to be able to indirectly deduce the motion of the components of the passenger transport system in this way. In this case, too, the speed information obtained can be used to synchronize the data of the digital double with respect to speeds of the components virtually moved therein with the actual moving components of the passenger transport system.

According to a further specific embodiment, the synchronization can additionally or alternatively be carried out taking into account moving position information, wherein the moving position information is determined by observing a marking which is fixed at a location of a moving component of the passenger transport system and is moved along by it.

In other words, one or more markings can be attached, for example, to a step belt or a plate belt at one or more predetermined positions. Such a marking can, for example, be visually recognizable and thus be detected by a camera or the like. For example, the marking can be designed as a color marking. Alternatively, the marking can also be formed by intrinsic properties of the moving component itself, for example, a visually well recognizable edge of a step or a plate. As a further alternative, the marking can be detectable in another way, for example, it can be electrically and/or magnetically detectable. Suitable sensors can be configured and/or arranged on the passenger transport system at suitable positions in order to be able to observe the marking(s) and to provide corresponding moving position information. Due to this moving position information, the actual motions of the observed component and the current position of the marking of this component can thus be deduced. The marking can also be virtually represented in the digital double. Accordingly, the data obtained from the digital double can be suitably processed in order to synchronize them with the actual motions and the correct correspondence of the marking of the observed component.

According to one embodiment, to analyze motions of the determined dynamic objects, a comparison of the motions of the determined dynamic objects with stored motion scenarios which represent potential hazardous situations can be carried out.

In particular, an automated recognition process and/or assessment process of critical situations can take place in the hazard analysis module, wherein the motions of the determined dynamic objects extracted by known analysis methods are assessed. In order to carry out the assessment process, a set with atypical motion scenarios of critical situations can be stored in the hazard analysis module. This set can comprise various motion scenarios which can be compared with the motions of the determined dynamic objects extracted from motion sequence recordings. This set of stored motion scenarios can be generated, for example, through a machine learning process by using a dummy or stuntman to recreate and capture typical critical situations such as falls or careless actions on the passenger transport system and to include the extracted motion sequences in the set as stored motion scenarios. Of course, it can also be possible to create such motion scenarios purely virtually with suitable software and sufficient computing power. Of course, the set can also be supplemented with further stored motion scenarios which, during operation of the passenger transport system, had led to an accident and were not recognized by the hazard analysis module. If a dynamic object corresponds sufficiently to a stored motion scenario, the hazard analysis module can assume the presence of a hazardous situation and can send out a warning and/or a warning signal.

According to one embodiment, the current hazardous situation on the passenger transport system can be evaluated based on a comparison of the determined dynamic objects with various stored motion scenarios. The warning can then be output depending on the evaluation of the hazardous situation.

The various atypical motion scenarios in the set can preferably have different weightings in the sense of a ranking. According to these weightings, different actions for influencing the travel operation of the passenger transport system can be defined.

For example, a control module can enable a connection between the manually actuated emergency stop triggering device and the controller of the corresponding passenger transport system for actuation when a detected fall of a user has a very high weighting and an emergency stop is defined as the action for this high weighting. The emergency stop can be initiated immediately when the monitoring personnel actuate the emergency stop triggering device.

If, for example, a user enters the passenger transport system counter to its transporting direction, this critical situation can have a medium weighting, and, for this medium weighting, it can be provided that the control module enables only the connection between the speed controller to be manually actuated and the controller of the corresponding passenger transport system for actuation.

It is also possible for a user to resolve the critical situation themselves—for example, by catching their fall by holding on to the handrail and then standing up again. Based upon the detected situation, this motion sequence recording can be immediately displayed, for example, on the screen of an interaction module so that the monitoring personnel are made aware of it and can, if necessary, remedy the causes of the near fall (user distraction, disturbing influences outside the escalator or moving walkway). However, the low weighting can have the effect that the control module does not enable any of the aforementioned connections. It should also be noted here that the establishment of a connection does not automatically mean that it is enabled.

A passenger transport system according to an embodiment of the disclosure can comprise a transport belt, a drive, a controller, and an embodiment of the monitoring system disclosed herein. The transport belt can be configured as a step belt or plate belt. The drive can be configured to displace the transport belt including passengers or objects standing thereon along a transport path. The drive can be controlled by the controller. Power can thereby be supplied by a frequency converter. An encoder can be provided on the transport belt or another component moved along with the transport belt in order to be able to detect motions of the transport belt. The monitoring system can be configured to recognize hazardous situations in the region of the transport belt and/or adjacent regions. For this purpose, its motion-sensing module can be directed at least toward partial regions of the transport belt. Warnings can be forwarded directly or indirectly to the controller in order, in the event of a hazardous situation, to slow down or stop the motion of the transport belt, for example.

Embodiments of the computer program product according to the disclosure can be formulated in any arbitrary computer language that can be interpreted by a processor. The computer program product can be stored on a computer-readable medium according to an embodiment of the disclosure. Such a computer readable medium can be portable. In particular, the medium can store data non-volatilely or volatilely. For example, the computer-readable medium can be a CD, a DVD, a flash memory, a ROM, an EPROM, or the like. Alternatively, the computer program can also be stored on a computer-readable medium in the form of a further computer, a server, a data cloud or the like, from where it can be downloaded over a data network, in particular the Internet.

It should be noted that possible advantages and designs of embodiments of the disclosure are described herein partly with reference to a monitoring method according to the disclosure and partly with reference to a monitoring system according to the disclosure. A person skilled in the art will recognize that the described features can be suitably transferred, adapted, exchanged, or modified in order to arrive at further embodiments of the disclosure.

BRIEF DESCRIPTION OF THE DRAWING

Embodiments of the disclosure will be described herein with reference to the accompanying drawing, with neither the drawing nor the description being intended to be interpreted as limiting the disclosure.

FIG. 1 shows a passenger transport system in a three-dimensional view, the travel operation of which is to be monitored, and a monitoring system for monitoring this passenger transport system according to one embodiment of the present disclosure.

The drawing is merely schematic and is not necessarily to scale. Like reference signs refer to like or equivalent features in the drawing.

DETAILED DESCRIPTION

FIG. 1 shows a three-dimensional view of a passenger transport system 1 with a plurality of escalators 3, 3", 3"', the travel operation F of which is monitored with a monitoring system 5. For this purpose, the monitoring system 5 has a hazard analysis module 7 and a motion-sensing module 9.

In order to be able to monitor the plurality of escalators 3', 3", 3"', the motion-sensing module 9 has a plurality of cameras 11', 11", 11"', 13', 13", 13"'. In the present exemplary embodiment, two escalators 3', 3" are shown in detail. The balustrade outlined with a broken line symbolizes a possible plurality of additional escalators 3"'. Each of these escalators 3, 3", 3"' is associated with two cameras 11', 13', 11", 13", 11"', 13"' of the motion-sensing module 9, which record real motion sequence recordings 15 of the travel operation F of an escalator associated therewith.

The hazard analysis module 7 and the motion-sensing module 9 are preferably connected to one another through a data network 17. In addition, the hazard analysis module 7 is also connected to a database module 19, from which data X, Y, Z of a digital double 29 of the passenger transport system 1 can be made available. The data network 17 can be set up in a variety of ways, such as via a local wired and/or wireless data network, via network connections in a cloud 47, via CAN bus systems, Bluetooth connections, and the like. The individual modules 7, 9, 19 can exchange data with one another, wherein this data exchange between the individual modules can take place unidirectionally or bidirectionally, as well as continuously, sequentially, or temporarily, as required.

Embodiments of the method according to the disclosure for monitoring the travel operation F of a passenger transport system 1 can be carried out with the monitoring system 5.

Each of the cameras 11', 13', 11", 13", 11"', 13"' of the motion-sensing module 9 is directed toward an associated passenger transport system 3', 3", 3"' and can capture electronically processable real motion sequence recordings 15 of situations 101A, 101B, 101C that occur on the passenger transport system 1. This can also include the immediate vicinity of the passenger transport system 1. The immediate vicinity can include, for example, the regions of a structure (not shown) upstream of the access regions 21, 23 in which the passenger transport system 1 is installed. The upstream regions of the structure are also referred to as entrances and may be monitored by proximity sensors (not shown) of the passenger transport system 1. The proximity sensors can transmit their detection data to an "automatic start/stop system" of the passenger transport system 1, which can usually be implemented in corresponding controllers 25', 25" of the escalator 3', 3", The controllers 25', 25" can control the operation of a corresponding drive 45 of the corresponding escalator 3', 3".

The motion-sensing modules 9 can use video cameras, thermal imaging cameras, laser scanners, TOF cameras, a combination of a plurality of sensors and the like, wherein the real motion sequence recordings 15 of which can accordingly be captured as a video film sequence, image sequence, thermal image sequence, etc. in an electronically processable form. When using a plurality of cameras 11, 13 or the like in the passenger transport system 1, each of the cameras 11, 13 can preferably be associated with a certain section or region. These regions can preferably overlap, so that there are no monitoring gaps in which critical situations 101A, 101B, 101C for users 102A, 102B, 102C can occur unobserved. Since monitoring should be as reliable as possible, the motion-sensing module 9 can preferably continuously capture what is happening on the passenger transport system 1. This can also include the motion-sensing module 9 transmitting its real motion sequence recordings 15 to the hazard analysis module 7 in real time.

The transmitted real motion sequence recordings 15 can be received in the hazard analysis module 7. Furthermore, data X, Y, Z of the digital double 29 stored in the database module 19 can be received by the hazard analysis module 7. These data X, Y, Z can allow a conclusion to be drawn about a visual appearance 30 of the passenger transport system 1 in a predetermined motion state. Accordingly, virtual motion sequence recordings 16 can be determined on the basis of a digital double 29 and can be made available to the hazard analysis module 7.

The hazard analysis module 7 can then determine information about dynamic objects 31, such as moving users 102A, 102B, 102C on the passenger transport system 1, and can use for this purpose both the received real motion sequence recordings 15 and the received data X, Y, Z of the digital double 29. In particular, a comparison of the virtual motion sequence recordings 16 with the real motion sequence recordings 15 can advantageously take place, for example by forming a difference between both types of motion sequence recordings 15, 16.

In this case, the real motion sequence recordings 15 can preferably be synchronized with the virtual motion sequence recordings 16 in such a way that the passenger transport system 1 is in an identical motion state in both motion sequence recordings 15, 16. For this purpose, data can be queried, for example, from the controller 25 in the passenger transport system 1, wherein these data represent information about a current motion state of the real passenger transport system 1. Alternatively or additionally, speed information can be queried from a frequency converter 33 of the passenger transport system 1 and/or signals of an encoder 35 on the passenger transport system 1 and used for synchronizing the two motion sequence recordings 15, 16. As a further alternative or addition, special markings 37 can be provided on movable components 39 of the passenger transport system 1, such as steps 41 of a transport belt 43, which also move together with these movable components 39. These markings 37 can, for example, be observed using a sensor system in order to obtain moving position information relating to the movable components 39, with which the positions of the virtual and real motion sequence recordings 15, 16 can in turn be synchronized in a precise manner.

The information about the dynamic objects 31 determined in this way can then be examined for hazardous situations 101A, 101B, 101C with analysis algorithms. These analysis algorithms can be based, for example, on known image processing techniques that are optimized and applied, for example, in self-learning processes using artificial intelligence in neural networks. A common image processing technique for generating information from an image is, for example, the calculation of a histogram which provides information about a statistical brightness distribution in the image. Such a histogram can serve, for example, as a configuration for further image processing steps or as information for a human user of software. Other computable information about an image is, for example, its entropy or average brightness. Based upon this information, vector analyses can follow how individual prominent points move relative to one another, and conclusions can be drawn from this about motion scenarios 103A, 103B, 103C of users 102A, 102B, 102C.

Of course, instead of the method steps described above, other or further analysis techniques and analysis methods known from the technical field of video surveillance can also be used to extract motion sequences of the users 101A, 101B, 101C from the motion sequence recordings 15, 16.

As soon as a motion sequence of a user 102 102A, 102B, 102C has been recognized by the hazard analysis module 7 and extracted, for example, as a skeletal motion sequence, the motion sequence can be compared with a stored set of possible hazardous situations or critical situations. More precisely, the situations stored in the set represent atypical motion scenarios 103A, 103B, 103C in the case of possible hazardous situations. As soon as the hazard analysis module 7 has detected a hazardous situation 101A, 101B, 101C, it outputs a warning 26. The warning 26 can, for example, be transmitted to a monitoring center 28. From there, in response to the warning 26, for example, operation of the passenger transport system 1 can be slowed or stopped by suitably influencing the controller 25 of the affected escalator 3. Furthermore, a suitable visual or acoustic warning signal can be output by signal devices 27 on the passenger transport system 1 in order to warn users of the passenger transport system 1.

For better understanding of the present disclosure, three hazardous situations 101A to 101C are shown by way of example on the passenger transport systems 1 shown in FIG. 1 and in the immediate vicinities thereof. A set of possible motion scenarios 103A, 103B, 103C that match these hazardous situations 101A, 101B, 101C are provided in the hazard analysis module 7, with which scenarios dynamic objects 31 extracted from the real motion sequence recordings 15 can be compared. The possible location at which such a hazardous situation 101A, 101B, 101C can take place may also play a role. An atypical motion scenario 103A, which represents, for example, a fall in the inclined central section of an escalator 3", may not occur in the same way in the entrance of the passenger transport system 1 or in one of the access regions 21, 23. The set of atypical motion scenarios 103A, 103B, 103C can be generated, for example, through a machine learning process by using a dummy or stuntman to recreate typical hazardous situations 101A, 101B, 101C such as falls or careless actions on the passenger transport system 1. The dynamic objects 31 or their motion sequences captured and extracted in this case can be included in the set as atypical motion scenarios 103A, 103B, 103C. Of course, the set can also be supplemented with further atypical motion scenarios which, during operation of the passenger transport system 1, had led to an accident and were not recognized by the hazard analysis module 7. If a dynamic object 31 corresponds sufficiently to an atypical motion scenario 103A, 103B, 103C, the hazard analysis module 7 can assume or identify the presence of a hazardous situation or can output a warning 26.

The various atypical motion scenarios 103A, 103B, 103C can have different weightings in the sense of a ranking. In accordance with this ranking, instructions (not shown) for how the travel operation F of the affected escalator 3', 3" is to be influenced can be saved in the monitoring center 28. Depending on the weighting, for example, an emergency stop may be initiated, the driving speed may be reduced, an acoustic and/or visual warning may be output, etc. The hazardous situation 101A recorded by the motion-sensing module 9 can be recognized in the hazard analysis module 7 as a "fall" and the associated warning 26 can be provided with the highest weighting (=emergency stop), since continued travel operation F could lead to serious injuries to the user 102A who has fallen.

The critical situation 101B recorded by the motion-sensing module 9 can be recognized in the hazard analysis module 7 as "entering in the wrong direction" and the associated warning 26 can be provided with the lowest weighting. By entering incorrectly, the user 102B does not put himself/herself in immediate danger, but rather disturbs the oncoming users when leaving the passenger transport system 1. For example, an optical and/or acoustic warning to the affected user 102B may be sufficient here.

The critical situation 101C recorded by the motion-sensing module 9 can be recognized in the hazard analysis module 7 as "entering with a shopping cart" and the associated warning 26 can be provided with a medium weighting. The user 102C may only be in danger when he/she reaches the ascending central section of the passenger transport system 1 with his/her shopping cart. In accordance with the medium weighting, the instruction can be that the travel speed F is reduced and an optical and/or acoustic warning is output. The reduction of the travel speed can allow the user 102C to leave the escalator 3' more easily in the opposite direction than at a normal travel speed. This can prevent the user with the shopping cart from reaching the ascending region of the escalator too quickly.

Finally, it should be noted that terms such as "comprising." "having." etc., do not exclude other elements or steps, and terms such as "a" or "an" do not exclude a plurality. Furthermore, it should be noted that features or steps which have been described with reference to one of the above exemplary embodiments may also be used in combination with other features or steps of other exemplary embodiments described above. Reference signs in the claims should not be considered to be limiting.

The invention claimed is:

1. A method for automated monitoring of a travel operation of a passenger transport system with a monitoring system, wherein the monitoring system comprises a hazard analysis module and at least one motion-sensing module, wherein the at least one motion-sensing module is directed toward the passenger transport system and is configured to capture electronically processable real motion sequence recordings of situations which occur on the passenger transport system, the method comprising:

receiving real motion sequence recordings in the hazard analysis module, wherein the real motion sequence recordings have been captured by the at least one motion-sensing module;

receiving data of a digital double of the passenger transport system in the hazard analysis module, wherein the data comprise at least information relating to physical properties of the passenger transport system which are used to determine a visual appearance of the passenger transport system in a predetermined motion state;

determining, by the hazard analysis module, virtual motion sequence recordings based on the data of the digital double received;

determining object information relating to dynamic objects on the passenger transport system by the hazard analysis module, wherein the object information is determined based on the data of the digital double received, the real motion sequence recordings, and the virtual motion sequence recordings, wherein the object information relating to the dynamic objects on the passenger transport system is determined by the hazard analysis module by comparing the virtual motion sequence recordings with the real motion sequence recordings;

determining hazard information relating to a current hazardous situation on the passenger transport system by the hazard analysis module based on an analysis of motions of the dynamic objects determined; and outputting a warning by the hazard analysis module based on the hazard information determined relating to the current hazardous situation.

2. The method of claim 1, wherein comparing the virtual motion sequence recordings with the real motion sequence recordings is carried out by forming a difference between the real motion sequence recordings and the virtual motion sequence recordings.

3. The method of claim 1, wherein the method further comprises synchronizing the real motion sequence recordings with the virtual motion sequence recordings such that movable components of the passenger transport system are in an identical motion state in both motion sequence recordings.

4. The method of claim 2, wherein the method further comprises synchronizing the real motion sequence recordings with the virtual motion sequence recordings such that movable components of the passenger transport system are in an identical motion state in both motion sequence recordings.

5. The method of claim 3, wherein synchronizing takes place taking into account data which are received from a controller of the passenger transport system and which contain motion information about an actual current motion state of the passenger transport system.

6. The method of claim 3, wherein synchronizing is carried out taking into account speed information of a frequency converter of the passenger transport system or a signal of an encoder arranged on the passenger transport system.

7. The method of claim 5, wherein synchronizing is carried out taking into account speed information of a frequency converter of the passenger transport system or a signal of an encoder arranged on the passenger transport system.

8. The method of claim 3, wherein synchronizing is carried out taking into account moving position information, wherein the moving position information is determined by observing a marking which is fixed at a location of a movable component of the passenger transport system and is moved along by it.

9. The method of claim 5, wherein synchronizing is carried out taking into account moving position information, wherein the moving position information is determined by observing a marking which is fixed at a location of a movable component of the passenger transport system and is moved along by it.

10. The method of claim 1, wherein a comparison of the motions of the dynamic objects determined with stored motion scenarios which represent potential hazardous situations is carried out in order to analyze the motions of the dynamic objects determined.

11. The method of claim 1, wherein a comparison of the motions of the dynamic objects determined with stored motion scenarios which represent potential hazardous situations is carried out in order to analyze the motions of the dynamic objects determined.

12. The method of claim 1, wherein the current hazardous situation on the passenger transport system is evaluated based on a comparison of the dynamic objects determined with various stored motion scenarios, and wherein the warning is output depending on the evaluation of the hazardous situation.

13. The method of claim 1, wherein the current hazardous situation on the passenger transport system is evaluated based on a comparison of the dynamic objects determined with various stored motion scenarios, and wherein the warning is output depending on the evaluation of the hazardous situation.

14. A monitoring system for monitoring travel operation of a passenger transport system, wherein the monitoring system comprises a hazard analysis module which is configured to receive data from a motion-sensing module and from a database module, wherein the motion-sensing module is directed toward the passenger transport system and is configured to capture electronically processable real motion sequence recordings of situations which occur on the passenger transport system, and wherein data of a digital double of the passenger transport system are stored in the database module, wherein the data comprise at least information relating to physical properties of the passenger transport system which are used to determine a visual appearance of the passenger transport system in a predetermined motion state, wherein the hazard analysis module is configured to carry out or control the method of claim 1.

15. A passenger transport system, comprising:

a transport belt;

a drive for driving the transport belt;

a controller for controlling the drive;

the monitoring system of claim 14, wherein the motion-sensing module is directed at least toward partial regions of the transport belt.

16. A computer program product, comprising machine-readable program instructions which, when executed on a programmable device, causes a device to carry out or control the method of claim 1.

17. A computer program product, comprising machine-readable program instructions which, when executed on a programmable device, causes a device to carry out or control the method of claim 1.

18. A computer program product, comprising machine-readable program instructions which, when executed on a programmable device, causes a device to carry out or control the method of claim 2.

19. A computer-readable medium comprising the computer program product of claim 16 stored thereon.

* * * * *